(12) United States Patent
Zhang et al.

(10) Patent No.: US 9,578,179 B2
(45) Date of Patent: Feb. 21, 2017

(54) METHOD, APPARATUS AND SYSTEM FOR TRANSMITTING MULTIMEDIA DATA

(71) Applicant: TENCENT TECHNOLOGY (SHENZHEN) COMPANY LIMITED, Shenzhen (CN)

(72) Inventors: Ke Zhang, Shenzhen (CN); Jiajun Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 217 days.

(21) Appl. No.: 14/450,090

(22) Filed: Aug. 1, 2014

(65) Prior Publication Data

US 2014/0341086 A1 Nov. 20, 2014

Related U.S. Application Data

(63) Continuation of application No. PCT/CN2013/071190, filed on Jan. 31, 2013.

(30) Foreign Application Priority Data

Feb. 2, 2012 (CN) .......................... 2012 1 0023031

(51) Int. Cl.
*H04L 12/26* (2006.01)
*H04M 3/56* (2006.01)
(Continued)

(52) U.S. Cl.
CPC ............ *H04M 3/567* (2013.01); *H04L 65/403* (2013.01); *H04L 65/4038* (2013.01);
(Continued)

(58) Field of Classification Search
CPC ... H04L 65/4038; H04L 65/403; H04M 3/567; H04M 3/56
(Continued)

(56) References Cited

U.S. PATENT DOCUMENTS

2007/0005804 A1* 1/2007 Rideout .............. H04L 12/1822
709/246
2008/0059581 A1* 3/2008 Pepperell ............ H04L 12/1827
709/204
(Continued)

FOREIGN PATENT DOCUMENTS

| CN | 1570508 A | 1/2005 |
|---|---|---|
| CN | 1571508 A | 1/2005 |

(Continued)

OTHER PUBLICATIONS

Chinese Office Action issued Aug. 5, 2015 re: Chinese Application No. 201210023031.X; pp. 1-12.
(Continued)

*Primary Examiner* — Sai-Ming Chan
(74) *Attorney, Agent, or Firm* — Cantor Colburn LLP

(57) ABSTRACT

The present disclosure discloses a method, apparatus and system for transmitting multimedia data. After accessing to a multimedia conference room, a client encodes multimedia data to be transmitted, and transmits the encoded multimedia data to a multi-point control unit. The client receives a multimedia data packet sent by the multi-point control unit. The multimedia data packet is obtained by the multi-point control unit via encapsulating multimedia data sent by at least one client in the multimedia conference room. The client decodes the multimedia data packet, composes multimedia data obtained after decoding the multimedia data packet, and displays the composed multimedia data.

21 Claims, 4 Drawing Sheets

(51) Int. Cl.
*H04L 29/06* (2006.01)
*H04N 7/15* (2006.01)

(52) U.S. Cl.
CPC ........... *H04L 65/605* (2013.01); *H04N 7/152* (2013.01); *H04L 65/607* (2013.01)

(58) Field of Classification Search
USPC ........................................................ 370/260
See application file for complete search history.

(56) References Cited

U.S. PATENT DOCUMENTS

| | | | |
|---|---|---|---|
| 2008/0068446 A1 | 3/2008 | Barkley et al. | |
| 2010/0079575 A1* | 4/2010 | Ali | H04N 7/148 348/14.13 |
| 2010/0171807 A1 | 7/2010 | Tysso | |
| 2010/0271972 A1 | 10/2010 | Fujii et al. | |
| 2011/0261151 A1 | 10/2011 | Wang et al. | |

FOREIGN PATENT DOCUMENTS

| | | |
|---|---|---|
| CN | 101370114 A | 2/2009 |
| CN | 101588252 A | 11/2009 |
| CN | 101883240 A | 11/2010 |
| JP | 0670040 A | 3/1994 |
| JP | 2010503280 A | 1/2010 |
| WO | 2006066454 A1 | 6/2006 |
| WO | 2009084182 A1 | 7/2009 |

OTHER PUBLICATIONS

Korean Office Action issued May 28, 2015 re: Korean Application No. 10-2014-7024530; pp. 1-14.
International Search Report issued May 2, 2013 re: PCT/CN2013/071190 citing: CN1571508 A, CN 101588252 A, CN 101883240 A and WO 2006066454 A1.

\* cited by examiner

METHOD, APPARATUS AND SYSTEM FOR TRANSMITTING MULTIMEDIA DATA

CROSS REFERENCE TO RELATED APPLICATIONS

This is a continuation of International Patent Application Number PCT/CN2013/071190 filed on 31 Jan. 2013 which claims priority to Chinese Patent Application Number 201210023031.X filed on 2 Feb. 2012, the content of which said applications is herein incorporated by reference in its entirety.

TECHNICAL FIELD

The present disclosure relates to Internet video technologies, and more particularly, to a method, apparatus and system for transmitting multimedia data.

BACKGROUND

In a multimedia data transmission system, two or more users or groups at different places send multimedia data such as sound, video and documents to each other through transmission lines and multimedia devices, so as to achieve immediate and interactive communication, and thus a conference may be implemented.

FIG. 1 is a schematic diagram illustrating a conventional multimedia data transmission system. As shown in FIG. 1, the system includes a Multi-point Control Unit (MCU) and clients. The MCU communicates with the clients by using a private network. The MCU includes a multi-point controller and a multi-point media processor. The multi-point controller may be a multimedia conference server. The multimedia conference server may provide users with a plurality of virtual multimedia conference rooms. A user may select or create a multimedia conference room via the client. After accessing to the multimedia conference room, the user may interact with other users accessing to this multimedia conference room with multimedia data.

The multimedia data transmission system mainly involves singling transmission, singling control among server systems and multimedia data transmission. The signaling transmission is used in interaction between the multi-point controller and the clients. The signaling control among server systems is used in interaction between the multi-point controller and the multi-point media processor. The multimedia data transmission is used in interaction between the multi-point media processor and the clients. When a user wants to access to the multimedia data transmission system, the user interacts with the multi-point controller via the client through signaling interaction between the client and the multi-point controller, the multi-point controller interacts with the multi-point media processor through signaling control between the multi-point controller and the multi-point media processor, and the user is accessed to the multimedia conference room of the multimedia data transmission system according to a result of interaction between the multi-point controller and the multi-point media processor, and thus sharing of multimedia data may be performed.

FIG. 2 is a schematic flowchart illustrating a conventional method for transmitting multimedia data based on FIG. 1. As shown in FIG. 2, the method includes processing as follows.

At 201, a client sends a multi-point controller a multimedia call signaling and establishes a call connection.

The client may access to a multimedia data transmission system in a login mode or in a registration mode. If the login mode is selected, the multimedia call signaling includes information such as a user number, a user password and identification of a multimedia conference room and the like. If the registration mode is selected, the multimedia call signaling may not include any information.

The multimedia conference room may be an audio conference room, a video conference room or a data conference room.

By using the multimedia call signaling, the client and the multi-point controller may perform processing, such as call establishment, call processing, call warning, call connection and call release.

At 202, the multi-point controller and a multi-point media processor establish an accessing channel between the client and the multimedia conference room through signaling control among server systems.

If the login mode is selected, the multi-point controller performs authentication for a user. After the user passes the authentication, the multi-point controller interacts with the multi-point media processor through the signaling control among the server systems, allocates transmission bandwidth to the user, configures an input channel and an output channel, obtains a multimedia conference room corresponding to the identification of the multimedia conference room from the multi-point media processor, and establishes an accessing channel between the user and the multimedia conference room. If the registration mode is selected, the multi-point controller obtains multimedia conference rooms from the multi-point media processor, displays the obtained multimedia conference rooms to the client, so that the user may select a desired multimedia conference room or create a new multimedia conference room and perform registration. After the user's registration succeeds, the multi-point controller allocates transmission bandwidth to the user, configures an input channel and an output channel, and establishes an accessing channel between the user and the multimedia conference room. When a new multimedia conference room is created, the multi-point controller creates a mixer, for example, a multi-picture mixer, a sound mixer, for the user, and adds the input channel and the output channel.

At 203, the multi-point controller returns a multimedia call signaling response to the client.

At 204, the client accesses to the multimedia conference room, encodes multimedia data, and sends the encoded multimedia data to the multi-point media processor.

After determining to share the multimedia data, such as video data, with other members of the multimedia conference room, the user obtains video image information via the client, performs processing such as encoding and compressing for the video image information, and transmits the processed video image information to the multi-point media processor.

Real-time Transport Protocol (RTP) and Real-time Control Protocol (RTCP) may be used in transmission of the multimedia data between the multi-point media processor and the client.

At 205, the multi-point media processor receives the multimedia data sent by each client, decodes the multimedia data, and composes each decoded multimedia data.

In a multimedia conference room, for example, a video conference room, each member needs to know the video information of other members in real time, the multi-point media processor decodes the multimedia data sent by each client, and composes each decoded multimedia data to include the multimedia data of each client in the composed multimedia data.

At 206, the multi-point media processor encodes the composed multimedia data, and then sends it to each client for displaying.

The multi-point media processor encodes the composed multimedia data, and then sends the encoded multimedia data to each client in the multimedia conference room by means of broadcasting. The client receives the encoded multimedia data, decompresses and decodes the received encoded multimedia data, and displays the multimedia data. Thus, the user may obtain the multimedia data of other users in real time, and thus the multimedia data is shared among users.

Further, the multi-point media processor may reduce network packet loss by using a strategy of retransmitting lost packets, so as to ensure the reliability of the multimedia data transmission.

As can be seen, in the conventional multimedia data transmission system, the multi-point media processor is required to perform the processing of decompressing, decoding, compressing, encoding and the like for the received multimedia data such as audio and video data stream. Since a large number of clients are accessed to the multi-point media processor, there is a high requirement for the data processing performance of the multi-point media processor. Since high cost is needed to improve the data processing performance of the multi-point media processor, the use cost of the multimedia data transmission system is increased.

SUMMARY

Examples of the present disclosure provide a method, an apparatus and a system for transmitting multimedia data, so as to reduce the use cost of the multimedia data transmission system.

A method for transmitting multimedia data includes:

after accessing to a multimedia conference room, encoding, by a client, multimedia data to be transmitted, and transmitting the encoded multimedia data to a multi-point control unit;

receiving, by the client, a multimedia data packet sent by the multi-point control unit; the multimedia data packet being obtained by the multi-point control unit via encapsulating multimedia data sent by at least one client in the multimedia conference room; and decoding, by the client, the multimedia data packet; composing multimedia data obtained after decoding the multimedia data packet; and displaying the composed multimedia data.

An apparatus for transmitting multimedia data includes:

an accessing authentication module, to interact with a multi-point control unit and access to a multimedia conference room;

an encoding module, to encode multimedia data to be transmitted and output the encoded multimedia data;

a multimedia data sending module, to send the encoded multimedia data;

a multimedia data packet receiving module, to receive a multimedia data packet sent by the multi-point control unit and output the multimedia data packet; the multimedia data packet being obtained by the multi-point control unit via encapsulating multimedia data sent by at least one client in the multimedia conference room;

a decoding module, to decode the multimedia data packet and output multimedia data obtained after decoding the multimedia data packet, and a composing module, to compose the multimedia data obtained after decoding the multimedia data packet and display the composed multimedia data.

An apparatus for transmitting multimedia data includes:

a multimedia data receiving module, to receive multimedia data sent by clients in one multimedia conference room and output the multimedia data;

a multimedia data packet encapsulating module, to encapsulate the multimedia data outputted by the multimedia data receiving module to a multimedia data packet and output the multimedia data packet; and a multimedia data packet sending module, to send the multimedia data packet outputted by the multimedia data packet encapsulating module to the client.

A system for transmitting multimedia data includes: which comprises a client and a multi-point control unit, wherein the client is to interact with the multi-point control unit and access to a multimedia conference room; encode multimedia data to be transmitted and output the encoded multimedia data to the multi-point control unit; receive a multimedia data packet sent by the multi-point control unit, decode the multimedia data packet, compose multimedia data obtained after decoding the multimedia data packet and display the composed multimedia data; and the multi-point control unit is to interact with the client and access the client to the multimedia conference room, encapsulate multimedia data sent by clients in the multimedia conference room to a multimedia data packet, and send the multimedia data packet to the clients in the multimedia conference room.

As can be seen, in the method, apparatus and system for transmitting multimedia data according to examples of the present disclosure, the multimedia data to be transmitted is encoded and sent to the multi-point control unit, the multimedia data packet sent by the multi-point control unit is received. The multimedia data packet is obtained by encapsulating the received multimedia data sent by each client by the multi-point control unit. The multimedia data packet is decoded and the multimedia data obtained after decoding the multimedia data packet is composed and displayed. The multi-point control unit only encapsulates the received multimedia data sent by each client to the multimedia data packet, and sends the multimedia data packet, the requirement for data processing capability is low, it is unnecessary to perform a large amount of computation, and the cost is low, thereby reducing the use cost of the multimedia data transmission system. Further, in the whole process of sending, receiving, composing and displaying the multimedia data, the processing of encoding, compressing, decompressing and decoding is needed only once, thereby reducing the requirements for data processing capability of the system and saving the system resources.

DETAILED DESCRIPTION

In order to make the object, technical solution and merits of the present invention clearer, the present invention will be illustrated in detail hereinafter with reference to the accompanying drawings and specific examples.

Figure 3:
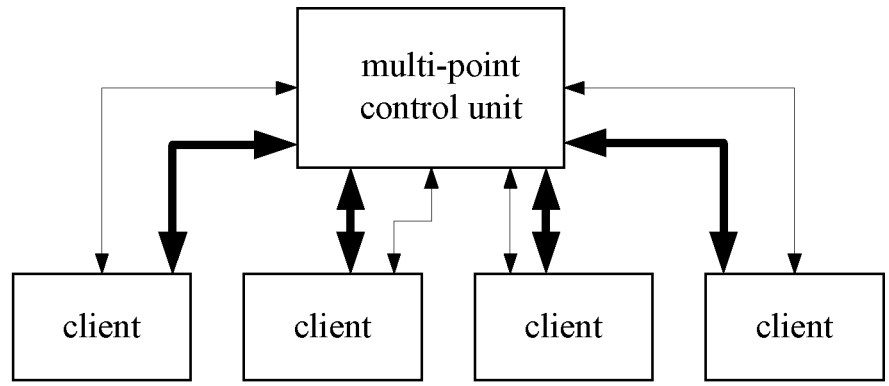
FIG. 3 is a schematic diagram illustrating a system for transmitting multimedia data according to an example of the present disclosure.

FIG. 3 is a schematic diagram illustrating a system for transmitting multimedia data according to an example of the present disclosure. As shown in FIG. 3, the system includes at least one client and a multi-point control unit.

The client is to access to a multimedia data transmission system after interacting with the multi-point control unit, encode multimedia data and send the encoded multimedia data to the multi-point control unit. The client is also to receive a multimedia data packet sent from the multi-point control unit, decode the multimedia data packet, compose the decoded multimedia data, and display the composed multimedia data.

In an example of the present disclosure, the procedure of accessing to the multimedia data transmission system by the client through interactive authentication with the multi-point control unit may refer to relevant technologies and is not described herein. For example, if determining to share the multimedia data, such as video data, with each member of a multimedia conference room of the accessed multimedia data transmission system, the user obtains video image information via the client, performs processing such as encoding and compressing for the video image information, and sends the processed video image information to the multi-point control unit.

The client receives the multimedia data packet sent from the multi-point control unit, decodes the multimedia data packet to obtain multiplexed multimedia data sent by the clients in the multimedia conference room, composes the obtained multiplexed multimedia data, and displays the composed multimedia data to the user.

In an example of the present disclosure, the multiplexed multimedia data received by the client may include multimedia data sent by all clients in the multimedia conference room. In such a case, the client directly composes the obtained multiplexed multimedia data and displays the composed multimedia data to the user.

In an example of the present disclosure, the multiplexed multimedia data received by the client may include multimedia data sent by other clients except the client itself in the multimedia conference room, that is, the client does not receive the multimedia data sent by the client itself. In such a case, the client obtains the multimedia data locally at first, composes the locally obtained multimedia data and the received multimedia data, and displays the composed multimedia data to the user. As a result, the multi-point control unit needs not to send the client the corresponding multimedia data, thereby avoiding waste of bandwidth and improving the efficiency of multimedia data transmission.

Therefore, by using the clients according to examples of the present disclosure, the situation that the client only decodes the multimedia data sent by the client itself during the multimedia data transmission is avoided, and the data processing capability of the client is thoroughly utilized. Furthermore, after the client accesses to the multimedia data transmission system to send the multimedia data of the client itself, and before the client displays the multimedia data corresponding to a plurality of clients, operations of encoding and decoding are performed only once, reducing the requirement to the data processing capability of the multimedia data transmission system.

The multi-point control unit is to interact with each client, access each client to the multimedia data transmission system, encapsulates the received multimedia data sent from the clients in the same multimedia conference room to a multimedia data packet, and transmits the packet to each client.

In an example of the present disclosure, the multi-point control unit may directly encapsulate the multimedia data sent by each client in the same multimedia conference room to the multimedia data packet, and transmits the multimedia data packet to each client. In an example of the present disclosure, the multi-point control unit may encapsulate the multimedia data sent by the other clients except a target client itself in the same multimedia conference room to the multimedia data packet, according to the target client of the multimedia data packet, and sends the packet to the target client, so as to decrease the amount of the multimedia data to be transmitted, thereby avoiding waste of the bandwidth and improving the efficiency of multimedia data transmission.

In an example of the present disclosure, the multi-point control unit receives the multimedia data and encapsulates the received multimedia data to the multimedia data packet. Compared with the conventional multi-point control unit, the processing of decompressing, decoding, encoding and compressing is not needed, thereby reducing the requirements for the data processing capability of the multi-point control unit, improving the performance of the multi-point control unit without increasing cost, reducing the use cost of the multimedia data transmission system.

Furthermore, when a large-scale networking is made for the multimedia data transmission system, by using examples of the present disclosure, the multi-point control unit only forwards the received multimedia data, and the requirements for the performance of the multi-point control unit is low. Therefore, networking and accessing of a plurality of clients may be realized with one multi-point control unit. In the prior art, however, due to the limitation of the performance of one single multi-point control unit, usually a plurality of multi-point control units are needed to form a cascade configuration to achieve the networking and accessing of a plurality of clients. However the input and output channels are limited due to the technical complexity, it is very difficult to achieve a full channel cascade. Therefore, by using examples of the present disclosure, multiple clients may be networked and accessed to multimedia data transmission system without the need of cascade, the cost of networking of the multimedia data transmission system is greatly reduced, and the use cost of the multimedia data transmission system is reduced.

In an example of the present disclosure, the multi-point control unit includes a multi-point controller and a multi-point media processor.

Figure 1:
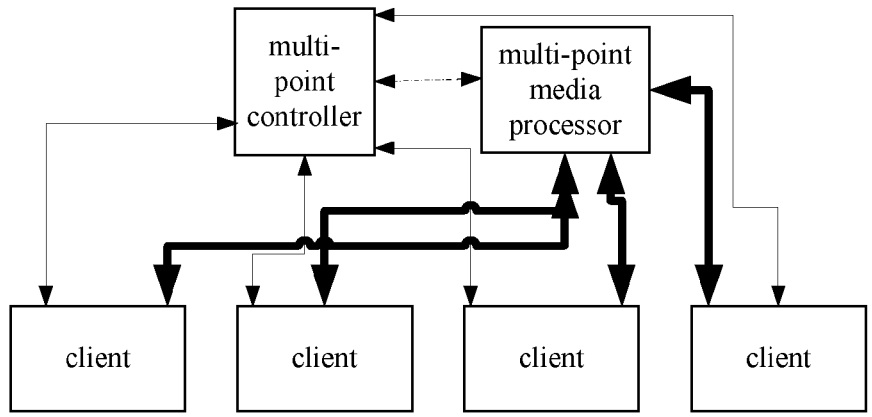
FIG. 1 is a schematic diagram illustrating a conventional multimedia data transmission system.
Figure 2:
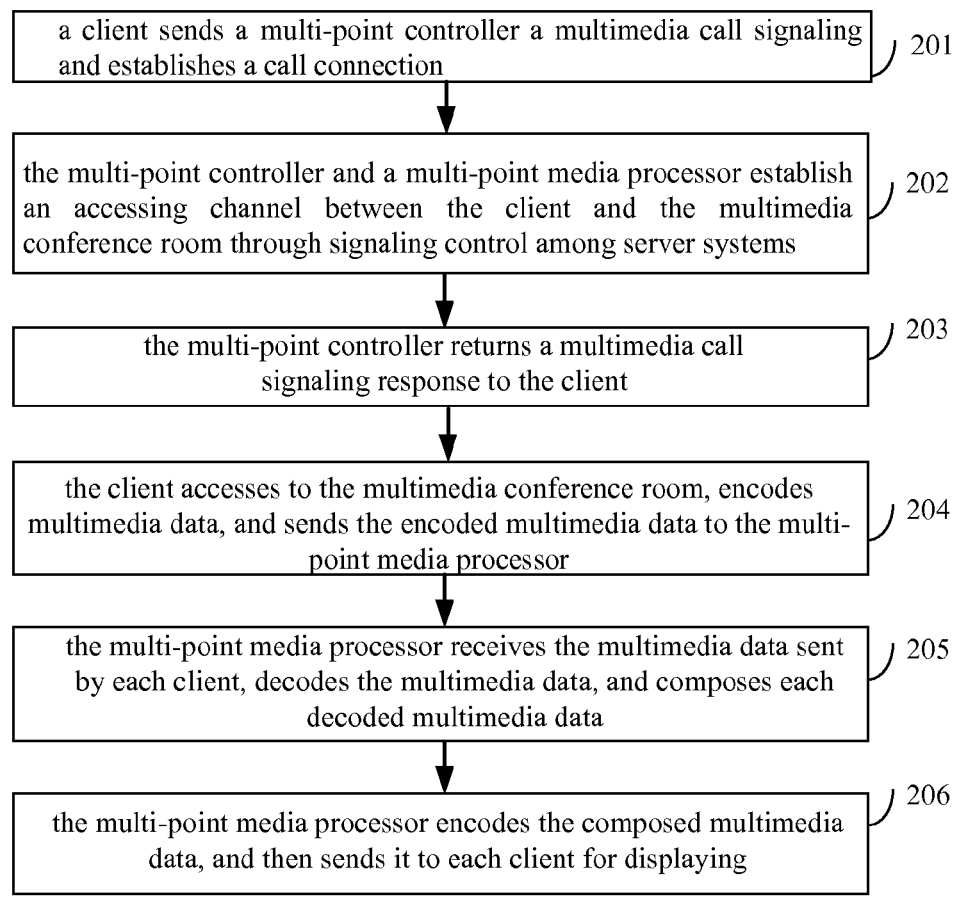
FIG. 2 is a schematic flowchart illustrating a conventional method for transmitting multimedia data based on FIG. 1.

The multi-point controller is to interact with the clients and access the clients to the multimedia data transmission system. In an example of the present disclosure, the structure, function of the multi-point controller and interaction thereof with the clients are the same as that in FIG. 1, and are not described herein.

The multi-point media processor is to encapsulate the received multimedia data sent by each client to the multimedia data packet and sends the multimedia data packet to each client. In an example of the present disclosure, RTP or RTCP can be used in the multimedia data transmission between the multi-point media processor and the clients.

With the development of technologies of multimedia data conference such as video conference and the promotion of applications, the conventional multimedia data transmission system is gradually being shifted from a high-end dedicated market to a low-end one, that is, from expert video conferences to the mass consumption. In examples of the present disclosure, since the client needs to only send the multimedia data of the client itself, the requirement for the upstream bandwidth is low. Since the client needs to receive the multimedia data sent by each client, the requirement for the downstream bandwidth is high. Such a characteristic corresponds to the network characteristic of the Internet, thus Internet may be used in the multimedia data transmission. Therefore, the complexity of the Internet-based transmission system architecture is low and the cost is low, which facilitates large-scale applications.

Figure 4:
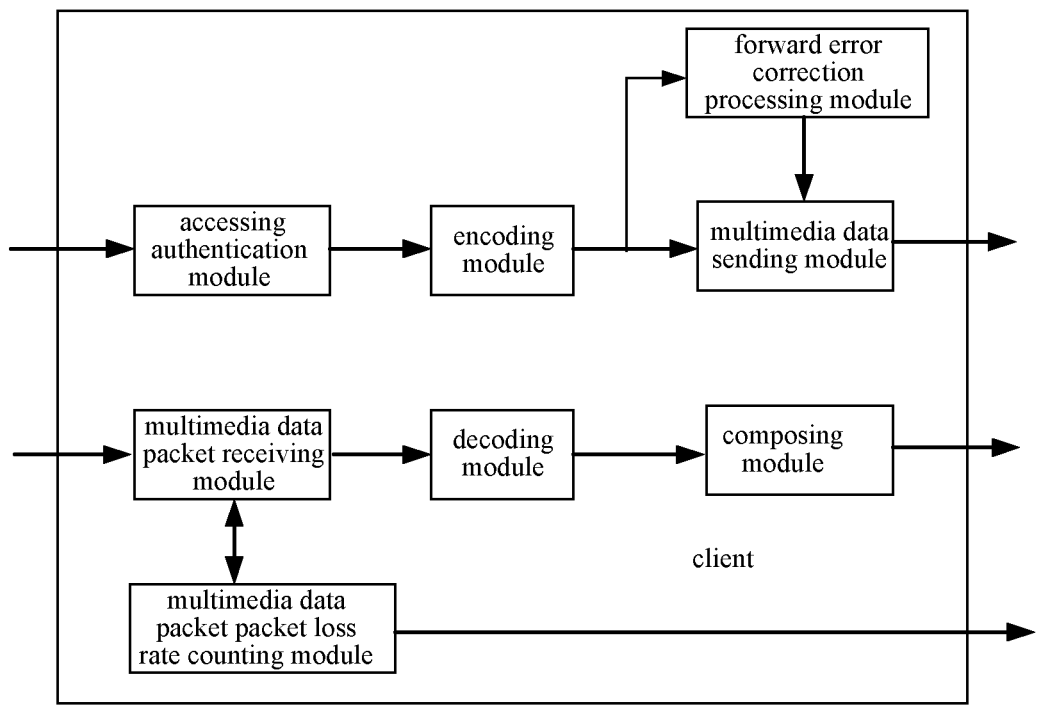
FIG. 4 is a schematic diagram illustrating a client according to an example of the present disclosure.

FIG. 4 is a schematic diagram illustrating a client according to an example of the present disclosure. As shown in FIG. 4, the client includes an accessing authentication module, an encoding module, a multimedia data sending module, a multimedia data packet receiving module, a decoding module and a composing module.

The accessing authentication module is to interact with a multi-point control unit and access the client to the multimedia data transmission system.

The encoding module is to encode multimedia data to be sent by the user, and output the encoded multimedia data to the multimedia data sending module. In an example of the present disclosure, the encoding module adopts Scaled Video Coding (SVC) technologies. A encoding frame sequence is classified into types of an Intra picture frame, i.e. I frame, a difference frame, i.e. P frame and Switching Predictive frame (SP), and etc.

The multimedia data sending module is to send the encoded multimedia data.

The multimedia data packet receiving module is to receive a multimedia data packet sent by the multi-point control unit, and output the multimedia data packet to the decoding module.

The decoding module is to decode the received multimedia data packet, and output the decoded multimedia data to the composing module.

The composing module is to compose the decoded multimedia data and display the composed multimedia data; or to compose the decoded multimedia data and locally obtained multimedia data and display the composed multimedia data.

The conventional multimedia data transmission system adopts the strategy of retransmitting lost packets to solve the problem of network packet loss, and thus the transmission delay of the multimedia data transmission system is indirectly increased, and service experiences of users are reduced. Especially in the Internet in which packet loss and network burst is high, network video quality cannot be ensured effectively by using the strategy of retransmitting lost packets.

In examples of the present disclosure, in order to ensure the effect of transmitting multimedia data such as video stream, the client uses a strategy of flexible Forward Error Correction (FEC) in encapsulating the multimedia data to be transmitted, so as to solve the technical problem of packet loss in video transmission. According to an example, by using a Lost Packet Recovery (LPR) mechanism in a data FEC method, the client adds redundant data for the multimedia data to be sent, so that a receiver may detect and correct errors, without the need of requesting the client to resend the missing information. The ability of correcting errors without waiting for resending makes FEC very suitable for real-time communication. Therefore, the client according to examples of the present disclosure further includes a forward error correction processing module The forward error correction processing module is to add redundant data in the multimedia data encoded by the encoding module according to the LPR mechanism, encapsulate the multimedia data including the added redundant data and send the encapsulated multimedia data to the multimedia data sending module.

In an example of the present disclosure, in practical applications, the forward error correction processing module may use different FEC control methods according to the importance of different frame types. For example, a strong FEC control method may be used for I frames which belong to the most important type among the three types of frames, so that the receiver may recover the frame even with 40% packet loss. The FEC control method may not be used for P frames which belong to the most unimportant type among the three types of frames, and the receiver may discard the frame directly if there is packet loss in the frame, which may not affect the sequence of other frames. In this way, balance among the packet loss rate, bandwidth and computational complexity is obtained through using FEC control methods differently.

Further, the client according to an example of the present disclosure further includes a multimedia data packet packet-loss-rate counting module which is to count the packet loss rate of the multimedia data packet received by the multimedia data packet receiving module, and output packet loss rate information to the multi-point control unit.

Figure 5:
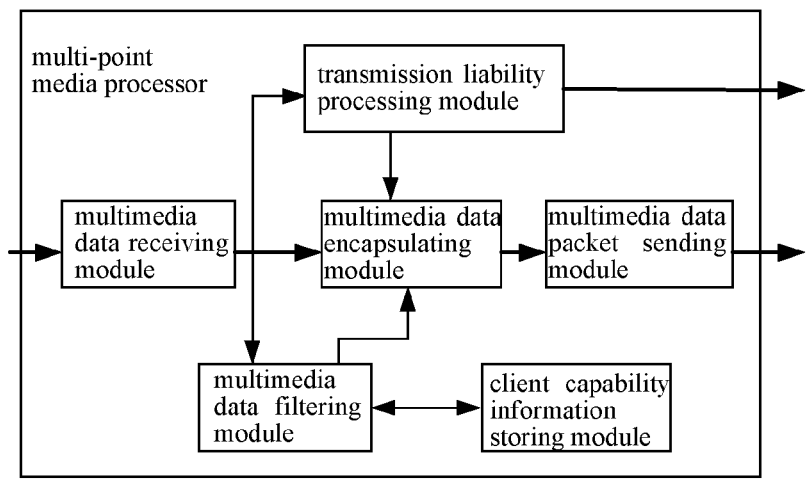
FIG. 5 is a schematic diagram illustrating a multi-point media processor according to an example of the present disclosure.

FIG. 5 is a schematic diagram illustrating a multi-point media processor according to an example of the present disclosure. As shown in FIG. 5, the multi-point media processor includes a multimedia data receiving module, a multimedia data packet encapsulating module and a multimedia data packet sending module.

The multimedia data receiving module is to receive multimedia data sent by each client in the same multimedia conference room, and output the received multimedia data to the multimedia data packet encapsulating module.

The multimedia data packet encapsulating module is to encapsulate the received multimedia data sent by the clients to a multimedia data packet, and output the multimedia data packet to the multimedia data packet sending module.

The multimedia data packet sending module is to send the received multimedia data packet to each client.

According to an example, the multimedia data packet encapsulating module may directly encapsulate the multimedia data sent by each client to the multimedia data packet, and the multimedia data packet sending module sends the same multimedia data packet to each client. According to an example, the multimedia data packet encapsulating module may encapsulate the multimedia data sent by the other clients except a target client itself in the same multimedia conference room to the multimedia data packet, according to the target client of the multimedia data packet, and send the multimedia data packet to the multimedia data packet sending module. The multimedia data packet sending module sends the multimedia data packet to the target client.

According to an example, the multi-point media processor may also use technologies of dividing data stream into multiple layers of different resolutions, qualities and frame rates, according to individual needs of each user. In such a case, the multi-point media processor further includes a client capability information storing module and a multimedia data filtering module.

The client capability information storing module is to store capability information of each client. In an example of the present disclosure, the clients with different capability have different transmission requirements. The capability information of the client includes any one of frame rate information, transmission quality information, protocol adaption information and client identification information of clients receiving the multimedia data, or any combination thereof.

The multimedia data filtering module is to process the multimedia data outputted by the multimedia data receiving module according to the capability information of each client stored by the client capability information storing module, and output the processed multimedia data to the multimedia data packet encapsulating module.

In an example of the present disclosure, for example, if the capability information includes the client identification information of the clients receiving the multimedia data, the multimedia data filtering module filters the multimedia data sent by the clients not corresponding to the client identification information according to client identification information set by the client, and then send the filtered multimedia data to the multimedia data packet encapsulating module, carrying the client identification information corresponding to the client capability information, so that the multimedia data packet encapsulating module may send the multimedia data to corresponding clients according to the carried client identification information after encapsulating the multimedia data, which meets the individual requirements of users.

According to an example, the multi-point media processor may also control the reliability of the multimedia data transmission. The multi-point media processor further includes a transmission reliability processing module. The transmission reliability processing module is to count the multimedia data sent by each client and received by the multimedia data receiving module, respectively calculate packet loss rate information for each client, determine transmission parameters for the client according to the packet loss rate information of the client, and send the determined transmission parameters to the client.

In an example of the present disclosure, the transmission reliability processing module controls the client uploading the multimedia data to change the encoding parameters according to the calculated packet loss rate. For example, if the packet loss rate of the client exceeds a packet loss rate threshold preset for the client, the client may be notified to use a smaller resolution and a smaller encoding rate.

in an example of the present disclosure, the transmission reliability processing module may also receive a multimedia data packet loss rate reported by the client. If the multimedia data packet loss rate exceeds a preset multimedia data packet loss rate threshold, P frames in VP8 SVC encoding sequence are discarded.

In an example of the present disclosure, P frames may be discarded because the SVC technology is used. In the SVC technology, the encoding sequence is I, P, SP, P, SP, P, SP. The P frames are the most unimportant because the P frames rely on preceding I frames or SP frames. The SP frames only rely on the preceding I frames and are relied by the following P frames, thus the importance of the SP frame is middle while the I frames are the most important. Thus, if the downlink packet loss rate is too high, the P frames are discarded in the forwarding process to reduce the downlink bandwidth. Although discarding the P frames will result in half of the frame rate, but the image quality will not be greatly reduced, thereby reducing the packet loss rate of the other frames.

In practical applications, the transmission reliability processing module may make a comprehensive decision for the packet loss rate according to the calculated packet loss rate information of the client and the multimedia data packet loss rate reported by the client.

Therefore, in the multimedia data transmission system according to examples of the present disclosure, after receiving the encoded multimedia data sent by each client, the multi-point control unit only encapsulates the received multimedia data sent by each client to the multimedia data packet. Each client receives the multimedia data packet sent by the multi-point control unit, decodes the multimedia data packet, composes the decoded multimedia data and displays the composed multimedia data. In this way, the multi-point control unit performs forwarding process, the requirement for data processing capability is low, it is unnecessary to perform a large amount of computation, and the cost is low, thereby reducing the use cost of the multimedia data transmission system. Further, in the whole process of sending, receiving, composing and displaying the multimedia data, the processing of encoding, compressing, decompressing and decoding is needed only once, thereby reducing the requirements for data processing capability of the system and saving the system resources. Moreover, the client uses the SVC encoding technology with the FEC strategy, and differentiation transmission strategies are used for the multimedia data transmission, so that not only the transmission quality of key frames is ensured, but also the retransmission of the lost multimedia data is avoided, and thus the bandwidth transmission resource is effectively saved. Meanwhile, since the client and the multi-point control unit respectively count the packet loss rate, the transmission strategy may be adjusted in real time according to the network conditions, thereby increasing the robustness of the transmission of the multimedia data such as video, audio and the like, and improving the reliability of transmission. Furthermore, since the client only transmits the multimedia data of the client itself, the requirement for the upstream bandwidth is relatively low, usually upstream bandwidth of 80 kps~300 kbps is occupied at a 320×240 resolution. In the downlink, the multiplexed multimedia data are received. For example, bandwidth of 800 kbps~2000 kps is occupied when there are ten downlinks. Such a network bandwidth demand characteristic may make full use of ordinary ADSL access used in current household, and conference services may be performed without applying for dedicated lines, thus it is simple to realize the conference services, and the network bandwidth may be used more effectively.

Figure 6:
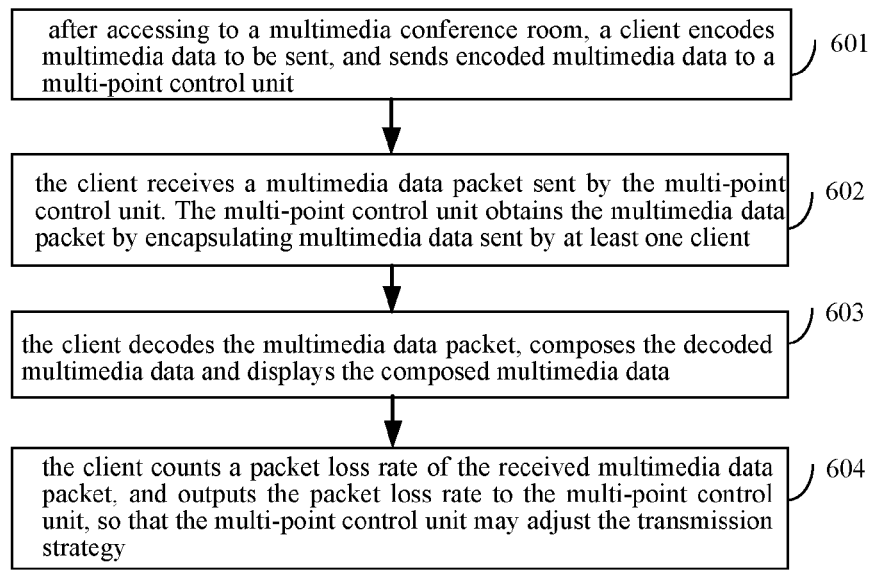
FIG. 6 is a schematic flowchart illustrating a method for transmitting multimedia data according to an example of the present disclosure.

FIG. 6 is a schematic flowchart illustrating a method for transmitting multimedia data according to an example of the present disclosure. As shown in FIG. 6, the method includes the following processing.

At 601, after accessing to a multimedia conference room, a client encodes multimedia data to be sent, and sends encoded multimedia data to a multi-point control unit.

According to an example, the client uses the SVC to encode the multimedia data, and an encoding frame sequence obtained after encoding the multimedia data includes I frames, P frames and SP frames.

According to an example, after encoding the multimedia data and before sending the encoded multimedia data to the multi-point control unit, redundant data is added in the encoded multimedia data according to a packet loss recovery mechanism, and the multimedia data added with the redundant data is encapsulated.

At 602, the client receives a multimedia data packet sent by the multi-point control unit. The multi-point control unit obtains the multimedia data packet by encapsulating multimedia data sent by at least one client.

According to an example, after receiving the multimedia data sent by the at least one client and before encapsulating the multimedia data, the multi-point control unit further processes the received multimedia data according to pre-stored capacity information of each client.

According to an example, the capability information of the client includes any one of frame rate information, transmission quality information, protocol adaption information, Maximum Transmission Unit (MTU), initial rate and client identification information of clients receiving the multimedia data, or any combination thereof. For example, if the capability information of the client includes the client identification information of the clients receiving the multimedia data, multimedia data sent by the clients not corresponding to the client identification information is filtered according to the client identification information set by the client.

At 603, the client decodes the multimedia data packet, composes the decoded multimedia data and displays the composed multimedia data.

In an example of the present disclosure, the method further includes the following processing.

At 604, the client counts a packet loss rate of the received multimedia data packet, and outputs the packet loss rate to the multi-point control unit, so that the multi-point control unit may adjust the transmission strategy.

According to an example, the multi-point control unit adjusts the transmission strategy according to the packet loss rate reported by the client. For example, if the packet loss rate exceeds a preset packet loss rate threshold, the transmission strategy is adjusted to discard P frames in the VP8 SVC encoding sequence.

According to an example, the following processing is further included in the method. Transmission parameter adjustment information outputted by the multi-point control unit is received, and transmission parameters for transmitting the multimedia data are adjusted. The multi-point control unit counts the received multimedia data sent by each client, respectively calculates the packet loss rate information of each client, so as to determine the transmission parameter adjustment information according to the packet loss rate information of the client.

Figure 7:
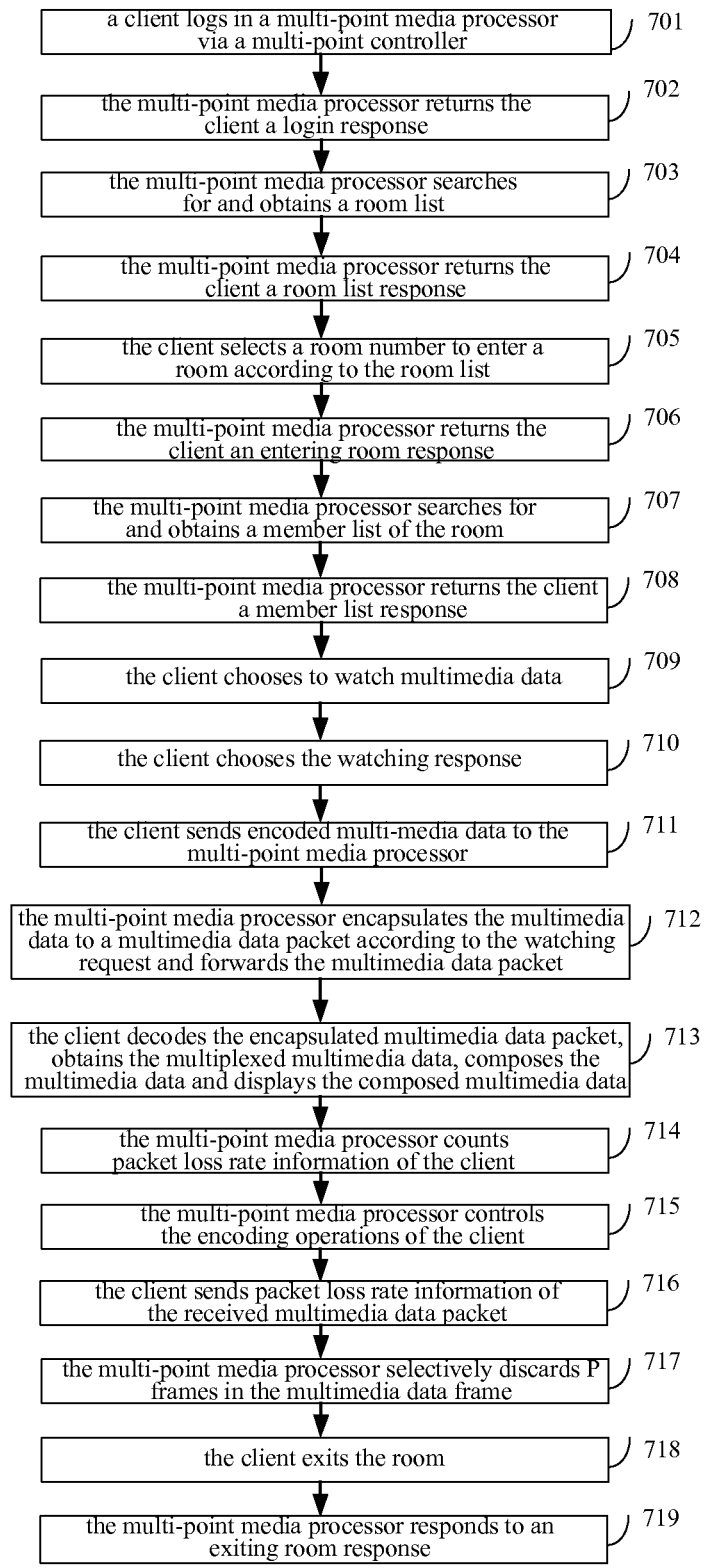
FIG. 7 is a schematic flowchart illustrating a method for transmitting multimedia data according to an example of the present disclosure.

FIG. 7 is a schematic flowchart illustrating a method for transmitting multimedia data according to an example of the present disclosure. Multiple clients and a multi-point media processor are mainly involved, and functions performed by the client and the multi-point media processor will be described briefly in connection with the preceding description. In an example, the multimedia conference room is a room supporting video data.

In an example of the present disclosure, the main functions of the client are summarized as follows:

1. multimedia data collection, encoding, sending RTP packets, receiving RTP packets, decoding and displaying;

2. receiving a control command sent from the multi-point media processor, performing feedback and controlling encoding;

3. processing multiplexed multimedia data, for example, displaying video, composing a plurality of pictures to one picture. The multimedia data packet (audio and video streams) received by the client is forwarded by the multi-point media processor, the multimedia data packet is quickly set frame and displayed in different displaying windows, so as to achieve the effect of composing a plurality of pictures.

The client may be one of various clients, such as, a PC multi-user video client software, a mobile phone video multi-user client software, or a TV multi-user video client software.

The main functions of the multi-point control unit are summarized as follows:

1. client registration management, connection heartbeat management;

2. room management, room creation and destruction, the client access and exit management;

3. receiving the multimedia data from the client, forwarding the multimedia data to the other clients in the same room, without performing any conversion of audio and video data. The multi-point media processor maintains a list of rooms to which each client selects to watch and a list of target rooms to which room media data is forwarded. The multi-point media processor receives the multimedia data sent by a plurality of clients, and forwards the multimedia data according to the list of target rooms to which the room media data is forwarded, without any processing for the multimedia data. Thus, a large number of resources of CPUs in the multi-point media processor may be saved, thereby directly increasing the processing ability of a single multi-point media processor.

4. counting a packet loss rate and processing lost frames during forwarding, or notifying the corresponding clients to change an encoding rate, resolution and frame rate etc.

As shown in FIG. 7, the method for transmitting multimedia data includes the processing as follows.

At 701, a client logs in a multi-point media processor via a multi-point controller.

At 702, the multi-point media processor returns the client a login response.

At 703, the multi-point media processor searches for and obtains a room list.

At 704, the multi-point media processor returns the client a room list response.

At 705, the client selects a room number to enter a room according to the room list.

At 706, the multi-point media processor returns the client an entering room response.

At 707, the multi-point media processor searches for and obtains a member list of the room.

At 708, the multi-point media processor returns the client a member list response.

At 709, the client chooses to watch multimedia data.

According to an example, the client sends watching request singling to the multi-point media processor, the multi-point media processor receives the watching request signaling and returns a watching response.

At 710, the client chooses the watching response.

At 711, the client sends encoded multi-media data to the multi-point media processor.

At 712, the multi-point media processor encapsulates the multimedia data to a multimedia data packet according to the watching request and forwards the multimedia data packet.

At 713, the client decodes the encapsulated multimedia data packet, obtains the multiplexed multimedia data, composes the multimedia data and displays the composed multimedia data.

At 714, the multi-point media processor counts packet loss rate information of the client.

At 715, the multi-point media processor controls the encoding operations of the client so that the client performs the encoding operations according to predetermined encoding information.

At 716, the client sends packet loss rate information of the received multimedia data packet.

At 717, the multi-point media processor selectively discards P frames in the multimedia data frame.

At 718, the client exits the room.

At 719, the multi-point media processor responds to an exiting room response.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement are within the protection scope of the present disclosure.

The invention claimed is:

1. A method for transmitting multimedia data, comprising:

encoding, by a client, multimedia data to be transmitted after accessing to a multimedia conference room, and transmitting the encoded multimedia data to a multi-point control unit;

receiving, by the client, a multimedia data packet sent by the multi-point control unit; the multimedia data packet being obtained by the multi-point control unit via encapsulating multimedia data encoded and sent by at least one client in the multimedia conference room; and decoding, by the client, the multimedia data packet; composing multimedia data obtained after decoding the multimedia data packet; and displaying the composed multimedia data.

2. The method of claim 1, further comprising:

receiving transmission parameter adjustment information outputted by the multi-point control unit; and adjusting transmission parameters for transmitting the multimedia data; wherein the transmission parameter adjustment information is determined according to a packet loss rate of the client; and wherein the multi-point control unit counts multimedia data sent by clients in the multimedia conference room and respectively calculates a packet loss rate for each client.

3. The method of claim 1, further comprising:

processing, by the multi-point control unit, the received multimedia data according to pre-stored capability information of the client.

4. The method of claim 3, wherein the capability information comprises at least one of frame rate information, transmission quality information, protocol adaptation information, a maximum transmission unit, an initial rate and client identification information of clients receiving the multimedia data.

5. The method of claim 1, after encoding the multimedia data to be transmitted and before transmitting the encoded multimedia data to the multi-point control unit, further comprising:

adding redundant data to the encoded multimedia data according to a packet loss recovery mechanism; and encapsulating the multimedia data comprising the added redundant data; wherein transmitting the encoded multimedia data to the multi-point control unit comprises:

transmitting the encapsulated multimedia data to the multi-point control unit.

6. The method of claim 1, further comprising:

counting packet loss rate information of the received multimedia data; and outputting the packet loss rate information to the multi-point control unit, wherein the packet loss rate information is configured by the multi-point control unit to determine whether to discard a frame of a preconfigured type.

7. An apparatus for transmitting multimedia data, comprising:

an accessing authentication module configured to interact with a multi-point control unit and access to a multimedia conference room;

an encoding module configured to encode multimedia data to be transmitted and output the encoded multimedia data;

a multimedia data sending module configured to send the encoded multimedia data;

a multimedia data packet receiving module configured to receive a multimedia data packet sent by the multi-point control unit and output the multimedia data packet;

the multimedia data packet being obtained by the multi-point control unit via encapsulating multimedia data encoded and sent by at least one client in the multimedia conference room;

a decoding module configured to decode the multimedia data packet and output multimedia data obtained after decoding the multimedia data packet, and a composing module configured to compose the multimedia data obtained after decoding the multimedia data packet and display the composed multimedia data.

8. The apparatus of claim 7, further comprising:

a forward error correction processing module configured to add redundant data to the encoded multimedia data outputted by the encoding module according to a packet loss recovery mechanism, encapsulate the multimedia data comprising the added redundant data and output the encapsulated multimedia data to the multimedia data sending module.

9. The apparatus of claim 7, further comprising:

a multimedia data packet packet-loss-rate counting module configured to count packet loss rate information of the multimedia data packet received by the multimedia data packet receiving module, and output the packet loss rate information to the multi-point control unit, the packet loss rate information being used by the multi-point control unit to determine whether to discard a frame of a preconfigured type.

10. An apparatus for transmitting multimedia data, comprising:

a multimedia data receiving module configured to receive multimedia data encoded and sent by clients in one multimedia conference room and output the multimedia data;

a multimedia data packet encapsulating module configured to encapsulate the multimedia data outputted by the multimedia data receiving module to a multimedia data packet and output the multimedia data packet; and a multimedia data packet sending module configured to send the multimedia data packet outputted by the multimedia data packet encapsulating module to the client.

11. The apparatus of claim 10, further comprising:

a client capability information storing module configured to store capability information of the client; and a multimedia data filtering module configured to processing the multimedia data outputted by the multimedia data receiving module according to the capability information of the client stored by the client capability information storing module, and output the processed multimedia data to the multimedia data packet encapsulating module.

12. The apparatus of claim 10, further comprising:

a transmission reliability processing module configured to respectively calculate packet loss rate information for each of the clients according to the multimedia data received by the multimedia data receiving module, determine transmission parameters for the client according to the packet loss rate information and send the transmission parameters to the client.

13. The apparatus of claim 12, wherein the transmission reliability processing module is further to receive a packet loss rate of the multimedia data packet reported by the client and determine whether to discard a frame of a preconfigured type.

14. A system for transmitting multimedia data, comprising at least one client and a multi-point control unit; wherein the client is to interact with the multi-point control unit and access to a multimedia conference room; encode multimedia data to be transmitted and output the encoded multimedia data to the multi-point control unit; receive a multimedia data packet sent by the multi-point control unit, decode the multimedia data packet, compose multimedia data obtained after decoding the multimedia data packet and display the composed multimedia data; and the multi-point control unit is to interact with the client and access the client to the multimedia conference room, encapsulate multimedia data encoded and sent by clients in the multimedia conference room to a multimedia data packet, and send the multimedia data packet to the clients in the multimedia conference room.

15. The system of claim 14, wherein the multi-point control unit comprises a multi-point controller and a multi-point media processor, wherein the multi-point controller is configured to interact with the client and enable the client to access the multimedia conference room; and the multi-point media processor is configured to encapsulate the received multimedia data sent by the client in the multimedia conference room, and send the multimedia data packet to the client in the multimedia conference room.

16. The system of claim 15, wherein the multi-point media processor comprises:

a multimedia data receiving module configured to receive the multimedia data sent by the clients in the multimedia conference room and output the multimedia data;

a multimedia data packet encapsulating module configured to encapsulate the multimedia data outputted by the multimedia data receiving module to the multimedia data packet and output the multimedia data packet; and a multimedia data packet sending module configured to send the multimedia data packet outputted by the multimedia data packet encapsulating module to the clients.

17. The system of claim 16, wherein the multi-point media processor further comprises:

a client capability information storing module configured to store capability information of the client; and a multimedia data filtering module configured to process the multimedia data outputted by the multimedia data receiving module according to the capability information of the client stored by the client capability information storing module, and output the processed multimedia data to the multimedia data packet encapsulating module.

18. The system of claim 16, wherein the multi-point media processor further comprises:

a transmission reliability processing module configured to calculate packet loss rate information for the clients respectively according to the multimedia data received by the multimedia data receiving module, determine transmission parameters for the clients respectively according to the packet loss rate information and send the transmission parameters to the clients respectively.

19. The system of claim 14, wherein the client comprises:
an accessing authentication module configured to interact with a multi-point control unit and access to a multimedia conference room;
an encoding module configured to encode multimedia data to be transmitted and output the encoded multimedia data;
a multimedia data sending module configured to send the encoded multimedia data;
a multimedia data packet receiving module configured to receive a multimedia data packet sent by the multi-point control unit and output the multimedia data packet;
the multimedia data packet being obtained by the multi-point control unit via encapsulating multimedia data sent by at least one client in the multimedia conference room;
a decoding module configured to decode the multimedia data packet and output multimedia data obtained after decoding the multimedia data packet, and
a composing module configured to compose the multimedia data obtained after decoding the multimedia data packet and display the composed multimedia data.

20. The system of claim 19, wherein the client further comprises:
a forward error correction processing module configured to add redundant data to the encoded multimedia data outputted by the encoding module according to a packet loss recovery mechanism, encapsulate the multimedia data comprising the added redundant data and output the encapsulated multimedia data to the multimedia data sending module.

21. The system of claim 19, wherein the client further comprises:
a multimedia data packet packet-loss-rate counting module configured to count packet loss rate information of the multimedia data packet received by the multimedia data packet receiving module, and output the packet loss rate information to the multi-point control unit, the packet loss rate information being used by the multi-point control unit to determine whether to discard a frame of a preconfigured type.

* * * * *